(12) United States Patent
Thompson

(10) Patent No.: US 9,156,313 B2
(45) Date of Patent: Oct. 13, 2015

(54) HYDROPLANING PERFORMANCE FOR A TIRE

(75) Inventor: Ronald Hobart Thompson, Greenville, SC (US)

(73) Assignees: COMPAGNIE GENERALE DES ESTABLISSEMENTS MICHELIN, Clermont-Ferrand (FR); MICHELIN RECHERCHE et TECHNIQUE S.A., Granges-Paccot (CH)

( * ) Notice: Subject to any disclaimer, the term of this patent is extended or adjusted under 35 U.S.C. 154(b) by 1012 days.

(21) Appl. No.: 13/140,275

(22) PCT Filed: Dec. 21, 2009

(86) PCT No.: PCT/US2009/068997
§ 371 (c)(1),
(2), (4) Date: Jun. 16, 2011

(87) PCT Pub. No.: WO2010/071883
PCT Pub. Date: Jun. 24, 2010

(65) Prior Publication Data
US 2012/0031535 A1    Feb. 9, 2012

(51) Int. Cl.
| B60C 9/18 | (2006.01) |
| B60C 9/22 | (2006.01) |
| B60C 99/00 | (2006.01) |
| B60C 9/00 | (2006.01) |
| B60C 9/20 | (2006.01) |

(52) U.S. Cl.
CPC ............... *B60C 9/18* (2013.01); *B60C 9/0064* (2013.04); *B60C 99/006* (2013.04); *B60C 9/2009* (2013.04); *B60C 9/22* (2013.01); *B60C 2009/1871* (2013.04); *B60C 2009/2016* (2013.04); *B60C 2009/2214* (2013.04); *Y10T 152/10* (2015.01)

(58) Field of Classification Search
CPC ............ B60C 9/18; B60C 17/00; B60C 17/04
USPC .......... 152/152, 516, 520, 196, 197, 246, 532, 152/209.5, 531
See application file for complete search history.

(56) References Cited

U.S. PATENT DOCUMENTS

| 1,440,974 A | 1/1922 | Dornburgh |
| 3,717,191 A | 2/1973 | Harrington et al. |

(Continued)

FOREIGN PATENT DOCUMENTS

| GB | 2002699 A | 2/1979 |
| WO | WO2008/045098 A1 | 4/2008 |
| WO | WO2008/073098 A1 | 6/2008 |

OTHER PUBLICATIONS

International Search Report with written opinion, dated Feb. 19, 2010.

*Primary Examiner* — Justin Fischer
*Assistant Examiner* — Robert Dye
(74) *Attorney, Agent, or Firm* — John Steckler Schwab

(57) ABSTRACT

This invention relates generally to an improved design that provides better hydroplaning performance for a tire, and, more specifically, to a tire that has a variable pressure shear band located below its tread that provides increased structural stiffness to the tire, helping the tire to resist deformation when the tire encounters water, thereby decreasing the tendency of the tire to hydroplane. Advantageously, the variable pressure shear band can improve the hydroplaning performance and rolling resistance simultaneously without degrading wear performance.

12 Claims, 13 Drawing Sheets

(56) References Cited

U.S. PATENT DOCUMENTS

| | | |
|---|---|---|
| 4,006,766 A | 2/1977 | Takayanagi et al. |
| 4,034,791 A | 7/1977 | Mirtain |
| 4,708,186 A | 11/1987 | Kopsco et al. |
| 5,343,918 A * | 9/1994 | Fontaine .................... 152/209.5 |
| 6,338,374 B1 | 1/2002 | Nguyen et al. |
| 6,371,182 B1 * | 4/2002 | Philpott et al. ................ 152/517 |
| 6,701,986 B2 | 3/2004 | Tanaka |
| 6,769,465 B2 | 8/2004 | Rhyne et al. |
| 7,032,637 B2 | 4/2006 | Meraldi |
| 7,201,194 B2 | 4/2007 | Rhyne et al. |
| 7,281,553 B1 | 10/2007 | Roesgen et al. |

* cited by examiner

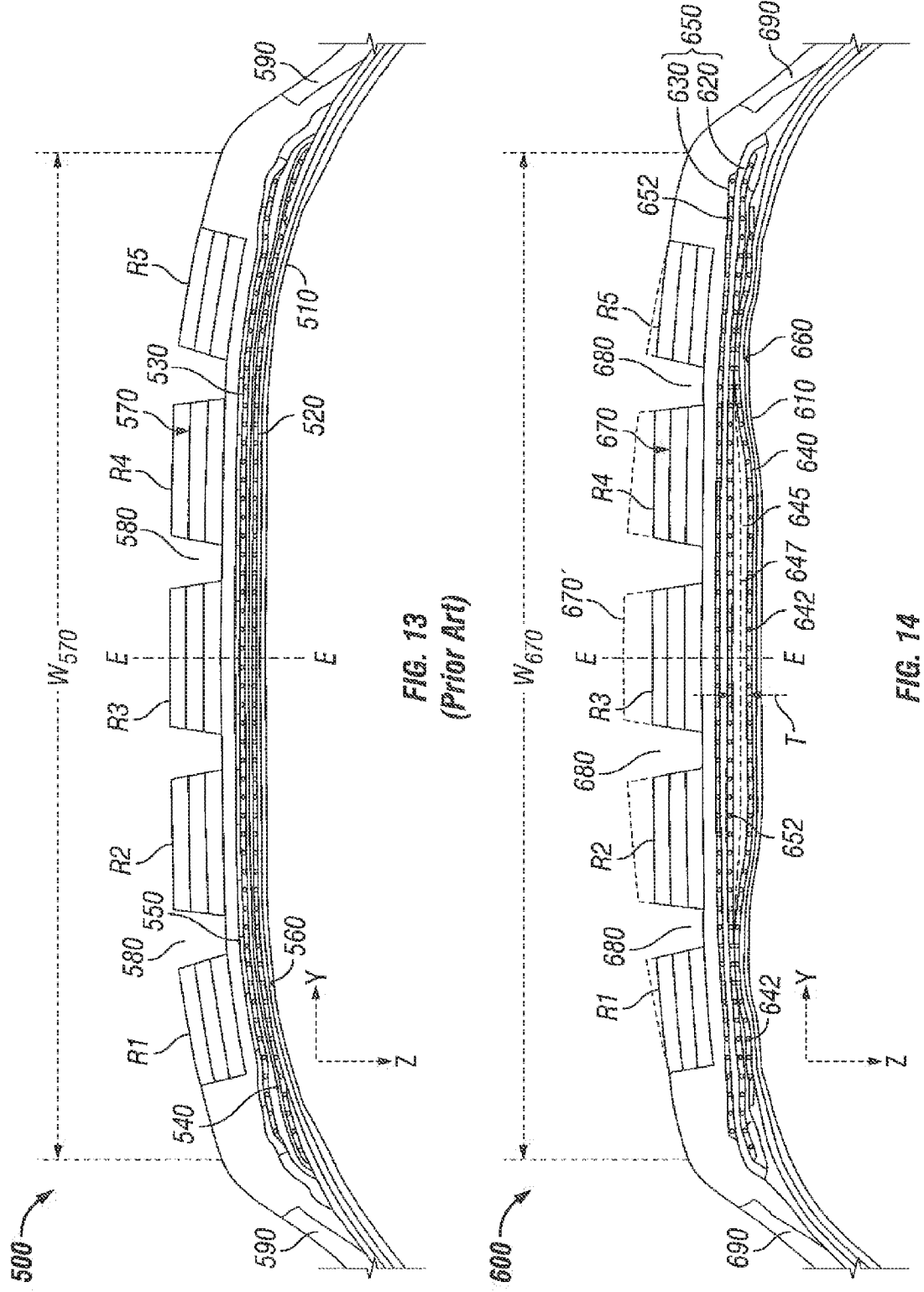

HYDROPLANING PERFORMANCE FOR A TIRE

BACKGROUND OF THE INVENTION

1. Field of the Invention

This invention relates generally to an improved design that provides better hydroplaning performance for a tire, and, more specifically, to a tire that has a variable pressure shear band located below its tread that provides increased structural stiffness to the tire, helping the tire to resist deformation when the tire encounters water, thereby decreasing the tendency of the tire to hydroplane. Advantageously, the variable pressure shear band can improve the hydroplaning performance and rolling resistance simultaneously without degrading wear performance.

2. Description of the Related Art

Those skilled in the art of pneumatic tires have developed a wealth of experience in adapting the tire construction to achieve a variety of performance combinations for tread wear, handling, wet and dry traction, rolling resistance, etc.

As an example of this adaptation, a pneumatic tire may be optimized for the vertical and tangential stresses in the tire's contact area between the outer surface (usually the tread) and the ground surface upon which the tire rolls. For example, good tread wear may be obtained when the vertical stresses between the tire and ground are uniformly distributed through the contact area and the tangential stresses are minimized. In particular, the tangential stress in the rolling direction should not change from strongly positive to strongly negative across the width of the contact area. However, to better improve the tire's resistance to hydroplaning on wet road surfaces, it is advantageous to have a higher vertical contact stress in the center portion of the contact area as compared to the shoulder, or lateral, portion of the contact area. This is usually achieved by adapting the tire construction or the curing mold transverse profile to obtain a transverse profile of the tire that is rounder than is desirable for optimized wear. In this case, the pneumatic tire will have an imbalanced tangential stress in the rolling direction, being significantly positive in the center portion and negative in the shoulder portion. Therefore, with the pneumatic tire, one skilled in the art has difficulty with optimizing the resistance to wear and resistance to hydroplaning simultaneously.

Non-pneumatic or structurally supported tires have been disclosed in the art. For example, U.S. Pat. No. 6,769,465, commonly owned by the Applicant of the present invention, relates to a structurally supported resilient tire that supports a load without internal air pressure. In an exemplary embodiment, this non-pneumatic tire includes a ground contacting portion and side wall portions that extend radially inward from the ground contacting portion and anchor in bead portions that are adapted to remain secure to a wheel during the rolling of the tire. A reinforced annular band is disposed radially inward of the ground contacting or tread portion. This shear band includes at least one shear layer, a first membrane adhered to the radially inward extent of the shear layer and a second membrane adhered to the radially outward extent of the shear layer. The invention of U.S. Pat. No. 6,769,465 provides several advantages including, for example, the ability to operate with partial or no inflation pressure and the flexibility to adjust the vertical stiffness of the tire somewhat independently of the ground contact pressure. This invention also provides a relatively well equilibrated contact pressure throughout the contact area.

By way of further example, U.S. Pat. No. 7,201,194, commonly owned by the Applicant of the present invention, also relates to a non-pneumatic tire. In an exemplary embodiment, this non-pneumatic tire includes an outer annular shear band and a plurality of web spokes that extend transversely across and radially inward from the annular band and are anchored in a wheel or hub. In certain exemplary embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, the invention of U.S. Pat. No. 7,201,194 also provides advantages that include a more uniform ground contact pressure throughout the length of the contact area.

As described for the exemplary embodiments of the references discussed above, both used an annular shear band comprising a shear layer to provide desirable performance benefits in a tire. As described below, Applicants have discovered an advantageous construction for the shear layer and, in certain embodiments for the tread properties as well, that allows either wear or hydroplaning to be improved without degrading the other performance. In some cases, rolling resistance can also be improved. This improved construction for the shear layer and tread has application in pneumatic tires, non-pneumatic tires, hybrid tires that operate at reduced inflation pressure in conjunction with structural support from an annular band, and other products as well.

SUMMARY OF THE INVENTION

Particular embodiments of the present invention include a tire with a contacting portion that has radial, longitudinal and axial directions and an equatorial plane. This tire further includes a variable pressure shear band that has a shear layer with a cross-section wherein the product ($G_{\mathit{eff}}*h$) varies in the axial direction of the tire, a first membrane that is adhered to the radially inward extent of the shear layer, and a second membrane that is adhered to the radially outward extent of the shear layer.

In certain cases, the shear layer of such a tire is constructed of a material having relatively consistent $G_{\mathit{eff}}$ with a height (h) of the shear layer varying.

In such a case, the ground contacting portion may have a tread with shoulder portions at each axial extent thereof and a center portion therebetween. Also, the shear layer has shoulder portions at each axial extent thereof and a center portion therebetween. The shoulder portions and center portion of the shear layer are found substantially radially below the shoulder and center portions of the tread respectively. The shear layer has a thickness that increases in the radially inward direction as the shear layer progresses from its shoulder portions to its center portion.

Furthermore, the shear layer may be thinnest at its shoulder portions and thickest at its center portion. Also, the neutral fiber of the shear layer may move radially, inward as the shear layer progresses from its shoulder portions to its center portion with the neutral axis reaching its lowest position substantially at the equator of the tire. In this particular embodiment, the first membrane may comprise glass monofilaments and the second membrane may comprise a first crossed ply belt and a second crossed ply belt that is on top of the first crossed ply belt.

In such a case, the tread may have an increased radial thickness near the equatorial plane of the tire.

In other embodiments, the shear layer comprises a plurality of axially disposed portions having different values of $G_{\mathit{eff}}$ which results in a ($G_{\mathit{eff}}*h$) that varies for the shear layer.

In still other embodiments, the ground contacting portion of the tire comprises a tread that has shoulder and center portions wherein the shoulder portions of the tread have different material properties than the center portion. The center portion may have an increased longitudinal shear compliance relative to the shoulder portions of the tread.

In other embodiments, the ground contacting portion of the tire comprises a tread that has shoulder and center portions wherein the center portion includes laterally oriented grooves of depth (H) which define tread elements of length (B) that results in increased longitudinal shear compliance of the center portion of the tread as compared to the shoulder portions of the tread. The parameter (H/B) is an indicator of the level of longitudinal compliance.

In some cases, the second membrane of the shear band is substantially inextensible while the first membrane resists compression. This helps the shear band to resist deformation when the tire encounters water, thereby improving the hydroplaning performance of the tire.

In such a case, the first membrane may comprise glass monofilaments and the second membrane may comprise a first crossed ply belt and a second crossed ply belt that is on top of the first crossed ply belt. The first and second crossed ply belts may have steel cords that are posed at +/−(15 to 25) degrees with respect to the equatorial plane of the tire. In a particular embodiment, the first and second crossed ply belts may have steel cords posed at +/−22 degrees.

Alternatively, the first and second membranes comprise annular reinforcements that are posed substantially in the longitudinal direction of the tire. These reinforcements may include steel cord(s) that are (is) wrapped substantially along the longitudinal direction of the tire and are (is) paced along the axial direction of the tire.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 13 is a section view of a tire 500 with conventional tire architecture without a variable pressure shear band that was built and tested.

FIG. 14 illustrates an embodiment of the present invention with a variable pressure shear band that was implemented in an actual tire 600 and tested.

DETAILED DESCRIPTION OF PARTICULAR EMBODIMENTS

Figure 1:
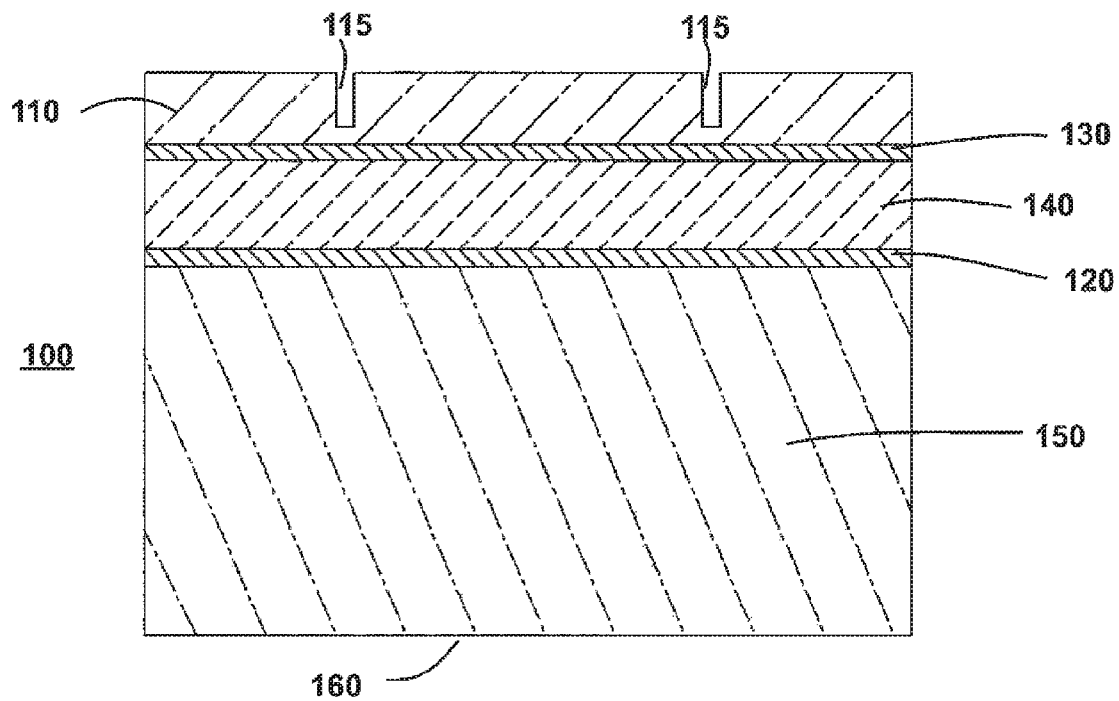
FIG. 1 depicts a section view through a meridian plane of the exemplary embodiment of tire 100.

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only half of the exemplary tire embodiments may be depicted in one or more of the figures. Reference numbers are used in the Figures solely to aid the reader in identifying the various elements and are not intended to introduce any limiting distinctions among the embodiments. Common or similar numbering for one embodiment indicates a similar element in the other embodiments. One of ordinary skill in the art, using the teachings disclosed herein, will understand that the same or substantially similar features are repeated on both sides of the tire.

DEFINITIONS

The following terms are defined as follows for this disclosure:

"Composite", as used herein, means constructed from two or more layers.

"Wheel" or "Hub" refers to any device or structure for supporting the tire and mounting to the vehicle axle, and such terms are interchangeable herein.

"Dynamic Shear Modulus" means the shear modulus measured per ASTM D5992.

"Elongation at Break" means the tensile elongation as measured by ASTM D412-98a and conducted at 100° C. rather than ambient.

"Hysteresis" means the dynamic loss tangent (max tan δ). The dynamic characteristics of the materials are measured on an MTS 831 Elastomer Test System in accordance with ASTM D5992. The response of a sample of vulcanized material (cylindrical test piece of a thickness of 4 mm and a section of 400 mm$^2$), subjected to an alternating single sinusoidal shearing stress, at a frequency of 10 Hz and at 80° C., is recorded. Scanning is effected at an amplitude of deformation of 0.1 to 50% (outward cycle), then of 50% to 0.1% (return cycle). The maximum shear modulus G* max in MPa and the maximum value of the tangent of the loss angle tan delta (max tan δ) is determined during the outward cycle.

"Modulus" of the membranes means the tensile modulus of elasticity at 1% elongation in the circumferential direction. This modulus can be calculated by Equations 2 or 3, below, for conventional tire steel belt materials. This modulus is noted as "$E_{membrane}$".

"Equatorial Plane" means a plane perpendicular to the axis of rotation of the tire passing through the centerline of the tire.

"Meridian Plane" means a plane parallel to the axis of rotation of the tire and extending radially outward from the axis.

"Radial" direction means radially outward and perpendicular to the axis of rotation.

In a right-hand, Cartesian coordinate system, the forward rolling direction is defined as the positive x-direction (also referred to as the circumferential or longitudinal direction of the tire); the vertical z-direction is defined as positive upward from the ground (also referred to as the radial direction of the tire); and the y-direction is parallel to the axis of rotation and positive to the left (also referred to as the transverse or axial direction of the tire). See, for example, FIG. 6.

"Compressive Modulus" ($E_c$) as used herein for the cords or cables of a ply is determined as follows. A mold is fabricated of the following dimensions: a length of 50 mm, a width of 30 mm, and a thickness of 25 mm. The cables are positioned precisely one relative to another in a parallel orientation using two rectangular supports (beams). The cables pass through holes in these supports, which are positioned in a parallel fashion 40 mm apart from one another. The spacing between the holes ensures an accurate pace of the cables. The pace reflects the pace that will be used in the ply in the tire. The distance between two supports (40 mm) is slightly smaller than the length of the mold (50 mm), such that the supports and the cables can be placed inside the mold. The cables and their supports are then placed in a mold such that the cables are located in the center of the mold in the thickness direction. For the dimensions listed above, this means that the centerline of the cables is approximately 12.5 mm from the bottom of the mold. Liquid polyurethane is poured into the mold, filling the mold. The mold is then placed in an oven for 24 hours at 110° C. After curing, the resulting sample has cables protruding from two sides in the length direction. The sample is cut with a saw such that these ends are removed along with a small thickness of polyurethane. The approximate final length is 40 mm. Cutting must be carefully controlled to ensure the cross-sections are perpendicular with the length of the cables being essentially equal to the sample width. Using the same mold, a sample is prepared that consists of polyurethane alone, with no cables. This sample is cured in the same manner as the samples containing cables, and it is cut to the same outer dimensions as the samples having cables.

Once ready for measurement, the samples are placed between two metallic platens in an INSTRON testing machine of type 44666 and compressed at a rate of 25 mm/min. The INSTRON machine is used to record force versus deflection. The measurements are taken for at least five samples. An elementary cable compression modulus is calculated by subtracting the force vs. deflection measurements of samples prepared without cables from the force vs. deflection measurements of samples prepared with cables. The resulting force vs. deflection values are used to compute the effective compressive modulus of the cables using the following equations:

$\epsilon_c$=compressive strain=compressive deflection/initial sample length $\sigma_c$=compressive stress=compressive force/Area where Area=total cross sectional area of cables contained in the sample $E_c$=compressive modulus $(E_c)$=$\sigma_c/\epsilon_c$ "Infinite Endurance Limit" means the referenced material can undertake at least 1 million cycles of a specified compressive strain without losing more than 10 percent of its tensile modulus, as determined by the following test method: Using a Zwick 1841 testing machine, a cord or strand of the material is placed into a loop with one end of the cord anchored and the other end attached to an imposed, cyclic displacement. The loop is maintained between two sheets of TEFLON. The starting diameter of the loop is determined by placing the loop in a compressive strain $\epsilon_c$ of 0.67 percent, where $\epsilon_c$=D/(2R)

D=diameter of the cord or strand of material
R=(0.5)*(starting diameter of the loop)

The material is then subjected, in a cyclic manner, to a predetermined compressive strain at a frequency of 3 Hz. Cycling is continued until the measured force at the compressive strain of 0.67 percent falls to 90 percent of its initial value, which indicates the properties of the material are beginning to degrade. The number of cycles at which this occurs is then determined. If the material can withstand at least 1,000,000 cycles at a specified compressive strain before falling to 90 percent, then as used herein, the material has an "infinite endurance limit" at the specified compressive strain.

"Pace" as used herein means the distance between cords in a given ply.

Detailed Description of FEA Study

Figure 6:
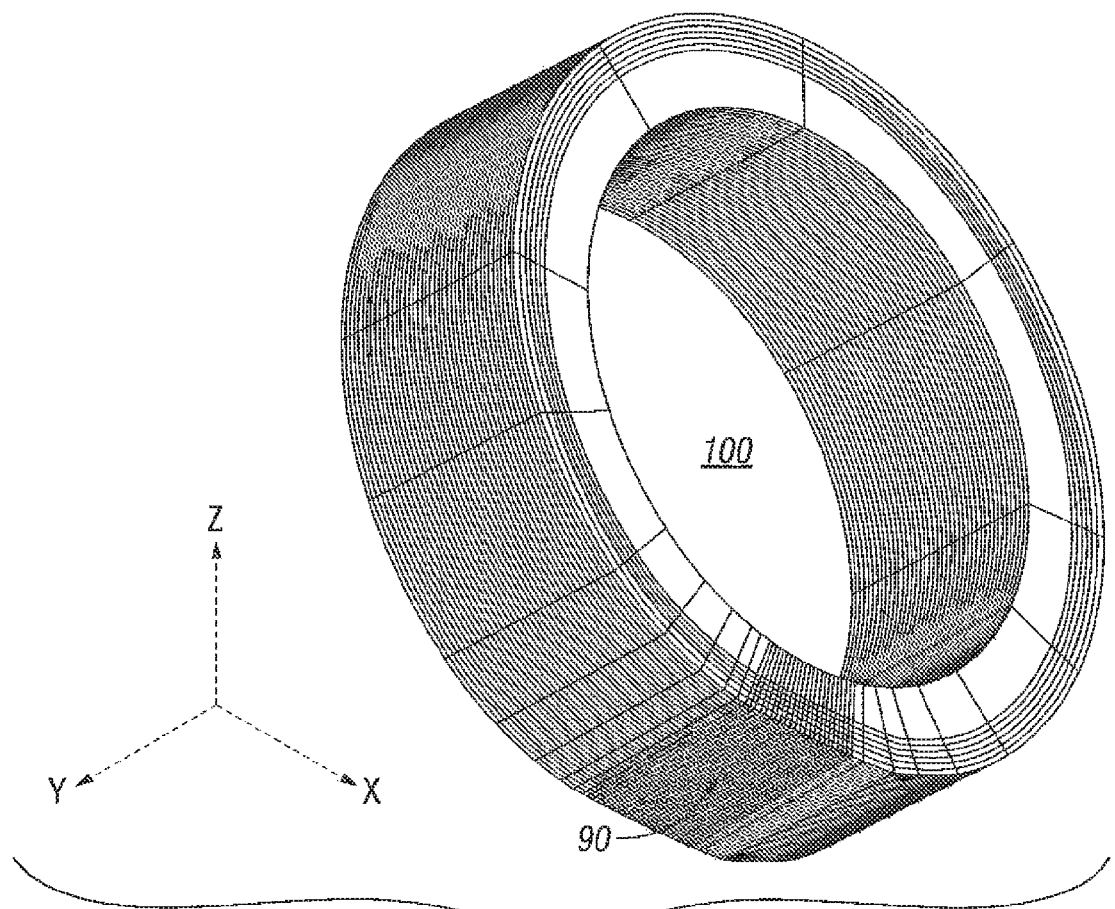
FIG. 6 is a perspective view of the exemplary embodiment of tire 100.

Initially, an FEA study was conducted to ascertain the feasibility of the inventor's concept. Accordingly, a non-pneumatic tire using the variable pressure shear band is represented herein by a three-dimensional (3D), structural finite element analysis (FEA) model of the operating components. The model is axisymmetric for an unloaded tire, but is fully three dimensional for the loaded tire in rolling contact with the ground. As shown in FIGS. 1 and 6 for a tire 100, the shear band is modeled as an assembly comprising two nearly inextensible membranes 120 and 130 in connection with the radially outer and inner surfaces of a shear layer 140. The shear layer 140 comprises one or more layers of an incompressible, linear material. A tread layer 110 for contacting the surface is posed radially outward of the shear band. Optionally, the tread layer 110 has one or more longitudinal tread groves 115. In the tire embodiments disclosed herein the tread layers are divided into three ribs; two shoulder ribs R1 and R3, and a center rib R2. An incompressible, linear material characterization is also used to model the tread layer 110. The shear band is connected to a web structure 150 comprising FEA elements that are compressible and extensionally stiff in the radial direction. The radial compression stiffness of these elements is zero, and the web elements are soft but have non-zero stiffness in the shear directions. The inner edge 160 of the web elements are connected to a rigid wheel (not shown). That is to say, the web structure 150 has little or no ability to support a load by direct action from the portion of the tread in the contact area 90 with the surface, but will support a load in tension through the web elements that are located out of the contact area. The FEA model uses structural elements having a linear formulation in the cross section or meridian plane. The FEA elements have a quadratic formulation in the circumferential direction when an element is outside of the contact area. The FEA elements have a linear formulation when an element is within the contact area 90.

When the shear band of tire 100 deforms substantially by shear deformation in shear layer 140, an advantageous relation is created allowing one to specify the values of the effective dynamic shear modulus $G_{eff}$ of layer 140 and its thickness h for a given application:

$$P_{eff} = (G_{eff} * h)/R \quad (1)$$

Where:
  $P_{eff}$=predetermined ground contact pressure
  $G_{eff}$=effective dynamic shear modulus of layer 140
  h=thickness of shear layer 140
  R=radial position of the outer inextensible membrane 130
$P_{eff}$ and R are design parameters chosen according to the intended use of the tire. The above equation then suggests that the product of the effective dynamic shear modulus $G_{eff}$ of the shear layer times the radial thickness of shear layer 140 is approximately equal to a product of a predetermined ground contact pressure times a radial position of the outermost extent of the outer membrane 130. The above relation is advantageous to one designing a tire. For example, to design a tire intended for passenger car use, the designer may select a design contact pressure $P_{eff}$ of 1.5 to 2.5 DaN/cm$^2$ and a tire size in which the radius R is about 335 mm. By multiplying these values, a "shear layer factor" of 50.25 to 83.75 DaN/cm may be determined, which can be used to specify the thickness h of shear layer 140 and the dynamic shear modulus G of shear layer 140.

For the purposes of the FEA model, the tensile modulus of the membranes 120 and 130 was set to 100,000 MPa, which corresponds to a close-packed winding of zero-degree steel cables, such as those used for tire belt material. For alternative construction, such as a set of reinforce plies having mutually angled cord reinforcements embedded in rubber, Equation 2 below provides a reasonable estimate for the tensile modulus:

$$E_{MEMBRANE} = \frac{E_{RUBBER}}{2(1-v^2)} \left[ \left(\frac{P}{P-D}\right)\frac{2-(1+v)\text{SIN}^2(2\alpha)}{\text{SIN}^4\alpha} + \left(\frac{t}{D}\right)\frac{1}{\text{TAN}^2\alpha}\left(\frac{1}{\text{TAN}^2\alpha}-v\right) \right] \quad (2)$$

Where:
  $E_{RUBBER}$=tensile modulus of the coating material
  P=cord pace (cord centerline spacing) measured perpendicular to the cord direction
  D=cord diameter
  v=Poisson's ratio for the coating material
  α=Cord angle with respect to the equatorial plane
  t=Rubber thickness between cables in adjacent layers
Note that $E'_{MEMBRANE}$ is the elastic modulus of the membrane times the effective thickness of the membrane. When the ratio $E'_{MEMBRANE}/G_{eff}$ is relatively low, deformation of the annular band under load approximates that of the homogeneous band and produces a non-uniform ground contact pressure. On the other hand, when the ratio $E_{MEMBRANE} G_{eff}$ is sufficiently high—for example greater than 100, deformation of the annular band under load is essentially by shear deformation shear layer 140 with little longitudinal extension or compression of the membranes. Accordingly, ground contact pressure is substantially uniform.

For a membrane in which the reinforcing cords are oriented at less than 10 degrees to the equatorial plane, the following can be used to estimate the tensile modulus of the membrane:

$$E_{MEMBRANE} = E_{CORD} * V \quad (3)$$

Where:
  $E_{CORD}$=tensile modulus of the cord
  V=volume fraction of the cable in the membrane
For membranes comprising a homogeneous material or a fiber or other material reinforced matrix, the modulus is the tensile modulus of the material or matrix. Additionally, although the shear layers are shown herein as single layers, they may comprise composite structures of one or more material layers have different properties as described, for example, in International Patent Application No. WO/2008/045098, which is commonly owned by the applicant.

Turning again to FIGS. 1 and 6, the tire 100 has an outside diameter or 330 mm and an axial width of 200 mm, similar to a 205/60R15 pneumatic tire. The model for the tread layer 110 of tire 100 assumes that the portion of the tread in contact with the ground is well-adhered and will not undergo slip. For the various embodiments described herein, the tires are loaded on a flat surface and a constant vertical load of 200 kg. This is a reasonable approximation for a loaded tire, rolling straight ahead and without an externally applied driving or braking torque. The following geometric and material parameters are exemplary of known tire materials. However, the tire models are not limited to these parameter values. The tread layer 110 has a modulus of 5 MPa and a radial thickness t of 10 mm. The membranes 120 and 130 have a tensile modulus of 100,000 MPa and a radial thickness of 1 mm. The material of shear layer 140 has an effective shear modulus of 1.67 MPa and a radial thickness of 20 mm. Lastly, the web structure 150 has a tensile modulus of 1 MPa, a compression modulus or 0.0001 MPa, and a radial thickness of 49 mm. This tensile modulus of web structure 150 is approximately equivalent to the radial stiffness of a fully three-dimensional model having discrete spokes made of a material with a tensile modulus of about 30 MPa.

Figure 7:
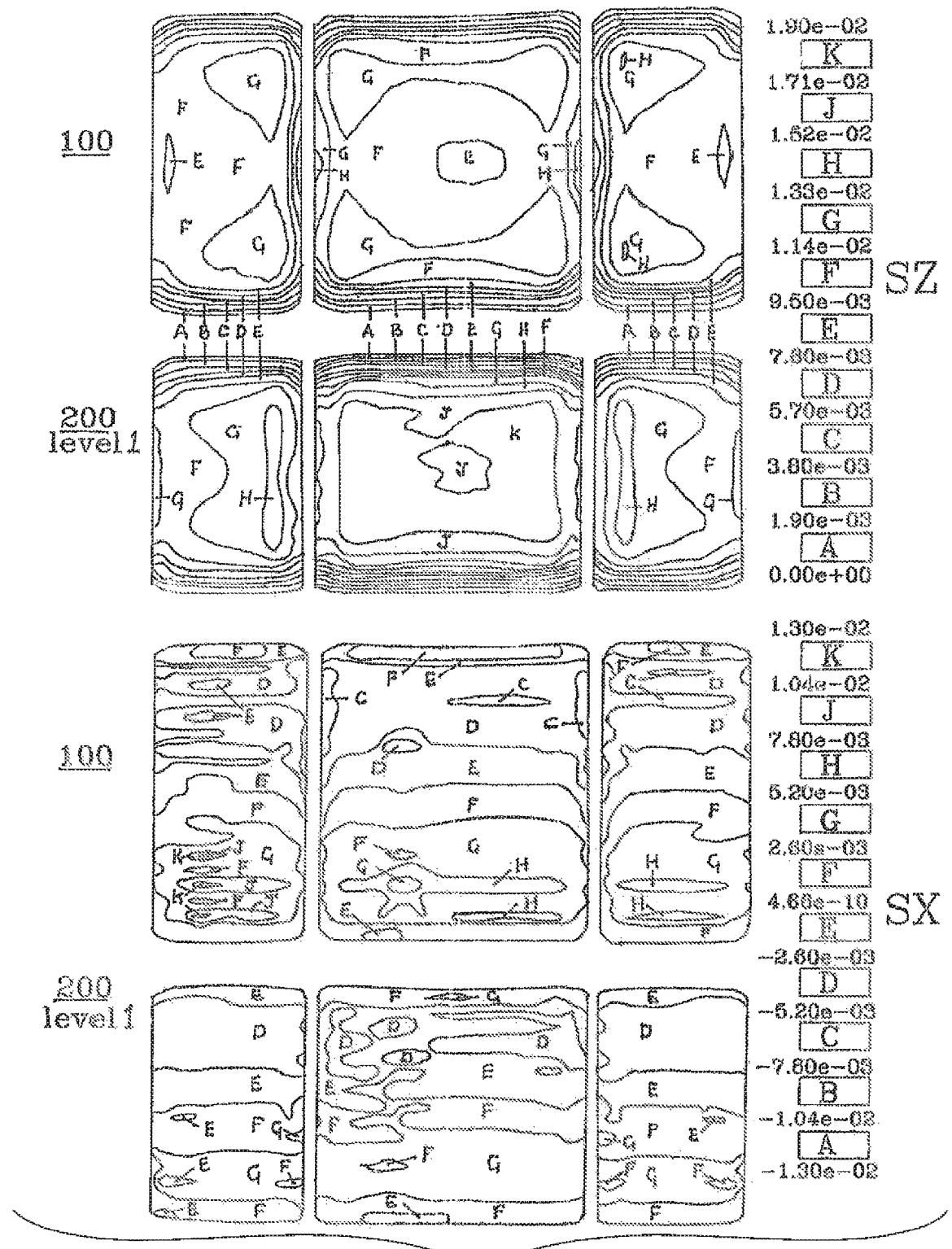
FIG. 7 is a contour depiction of the vertical and tangential contact stresses for the exemplary embodiment of tire 100 as compared to the exemplary embodiment of tire 200 (level 1).
Figure 12:
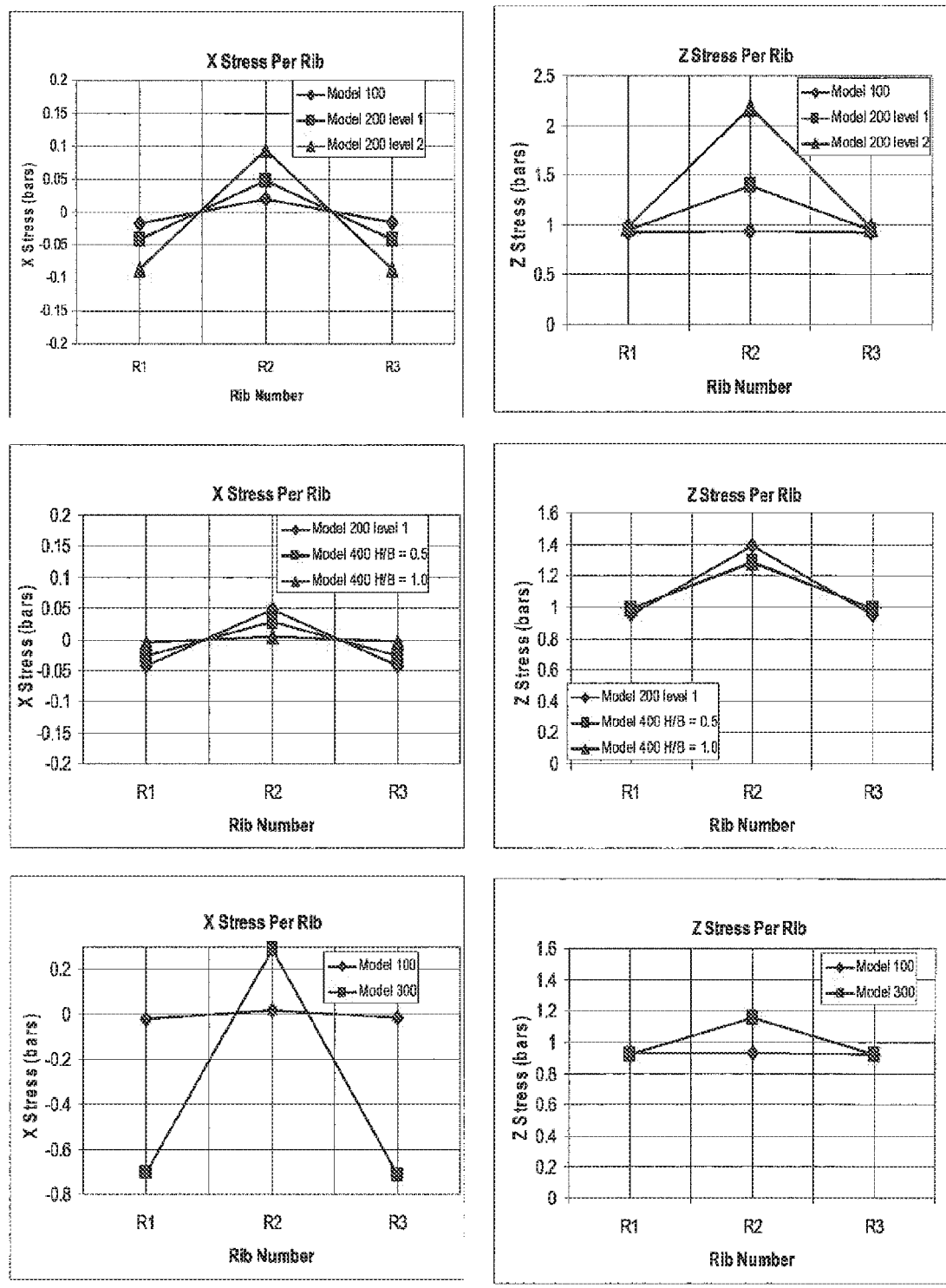
FIG. 12 is a graphical representation of the vertical and tangential contact stresses for the exemplary embodiments of tire 100, 200, 300, and 400, wherein the rib numbers R2 correspond to the central section of the tread and the ribs R1 and R3 correspond to the lateral portions.

FIGS. 7 and 12 shows for tire 100 the ground contact pressure SZ and the x-direction tangential stress SX for the design parameters just described. Table 1 provides a summary of the quantitative results. For the geometry of tire 100 and the specified material properties, Equation (1) produces an ideal contact pressure $P_{eff}$ of 1.0 bar. The calculated value of 0.92 bars found in Table 1 and shown graphically in FIG. 12 compares favorably to the ideal value. Therefore, the FEA model is a reliable representation of actual tire behavior. FIG. 7 provides a view of the shape of the contact area and a contour plot of the stress distributions. The vertical stress SZ is even distributed across the entire contact area, demonstrating the pneumatic-like behavior of the non-pneumatic tire 100.

Consider the relationship to estimate the ground contact pressure $P_{eff}$ of Equation (1). It is evident that for tires where the radius R of the outer membrane is substantially the same, then the product ($G_{eff}$*h) is the controlling factor for the contact pressure. Then, an increase in either $G_{eff}$ or h, or both, may be imposed to increase the contact pressure of the tire. Furthermore, a tire may be constructed having at least a first portion comprising a material having a first level of the product ($G_{eff}$*h) and at least a second portion having a second level of the product ($G_{eff}$*h). It is within the scope of the invention to have a plurality of laterally disposed portions, each having a particular level of the product ($G_{eff}$*h). These portions are not required to be discrete zones and may comprise a continuous variation of the level of the product ($G_{eff}$*h).

Figure 2:
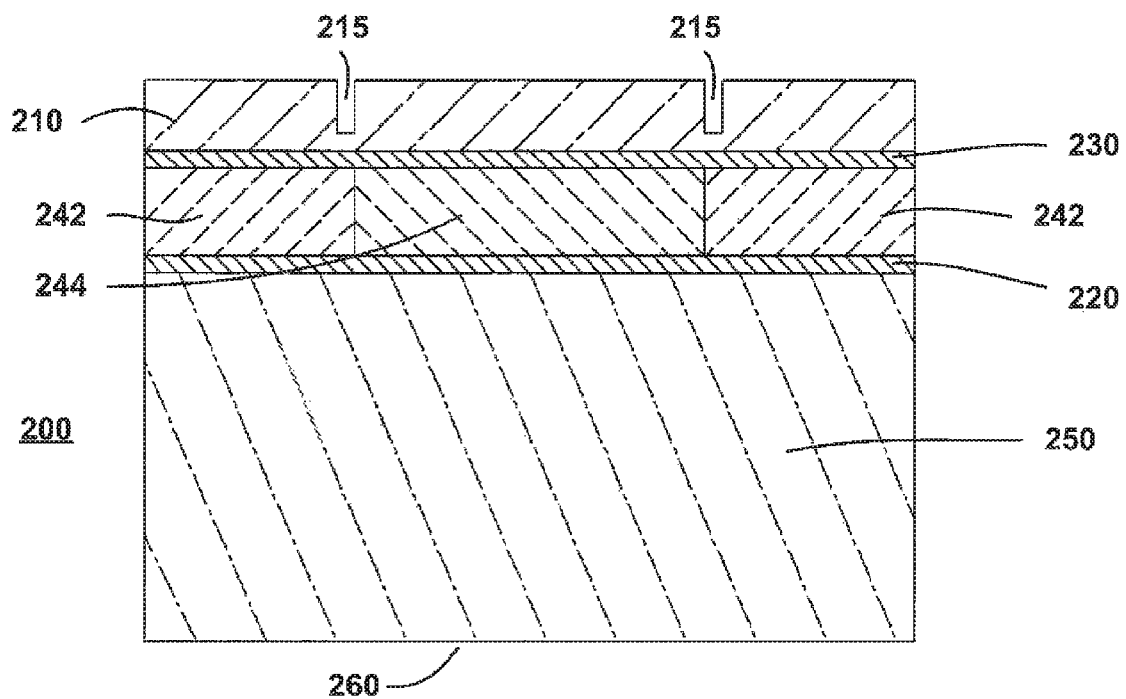
FIG. 2 depicts a section view through a meridian plane of the exemplary embodiment of tire 200 having a shear layer comprising center and lateral portions.
Figure 8:
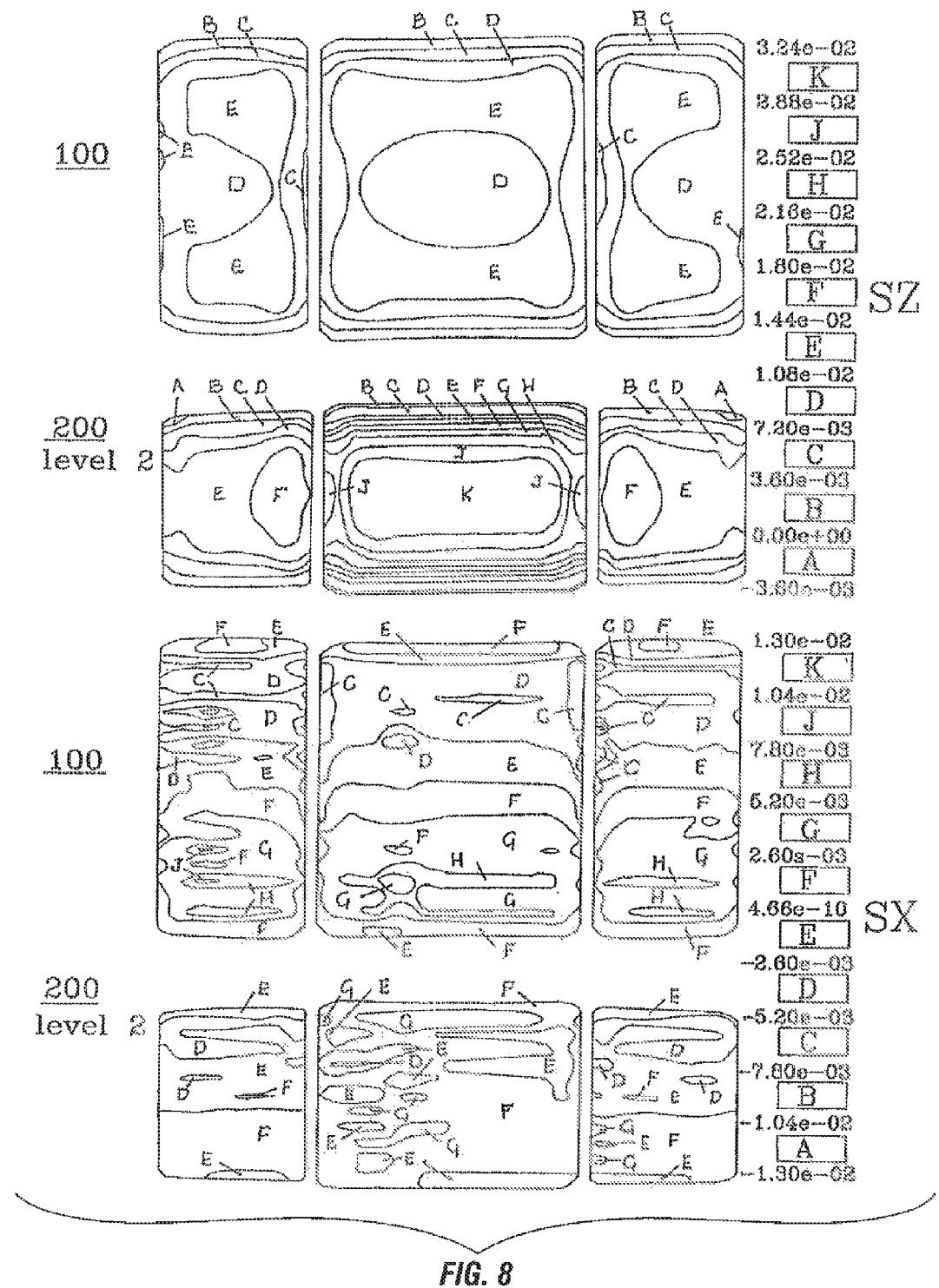
FIG. 8 is a contour depiction of the vertical and tangential contact stresses for the exemplary embodiment of tire 100 as compared to the exemplary embodiment of tire 200 (level 2).

The exemplary embodiment shown in FIG. 2 as tire 200 applies the principle of controlling the product ($G_{eff}$*h) through a variation of the material properties of the shear layer. Specifically, this embodiment has a shear layer comprising a central portion 244 and lateral or shoulder portions 242, wherein each portion has different material properties such as the shear modulus $G_{eff}$. In one example, a central portion 244 has a shear modulus (level 1) of 3.3 MPa or a shear modulus (level 2) of 6.6 MPa, and a lateral portion 242 remains at a shear modulus of 1.67 MPa. FIGS. 7 and 8 compare the reference tire 100 to the current embodiments labeled as tire 200 (level 1), and tire 200 (level 2), corresponding to the modulus level 1 and modulus level 2, respectively. The results clearly demonstrate an increased contact pressure SZ in the center portion. Table 1 quantitatively demonstrates that for the tire 200 (level 1) the average pressure SZ in the central portion is increase on average by about 40% (from 0.93 bars to 1.39 bars). For the tire 200 (level 2), the increase is about 120% (from 0.93 bars to 2.18 bars). Remarkably, the average contact pressure on the shoulder portions remains within 5% of the value for the reference tire 100. This is a truly unexpected result compared with the expectation for a pneumatic tire using similar material property variations. In the case of a pneumatic tire, one skilled in the art would expect only incremental changes. Another remarkable advantage of these embodiments of the invention is limited "end effect" for the transition between the center portion and lateral portion. As seen in both FIGS. 7 and 8, the highly loaded area of the center portion extends nearly the full width between the tread grooves 215. Therefore, the embodiment of tire 200 could also be applied to achieve an asymmetric tire having distinctly different loading and vertical stiffness relative to the inside or outside of the tire, as viewed when mounted on a vehicle.

Figure 3:
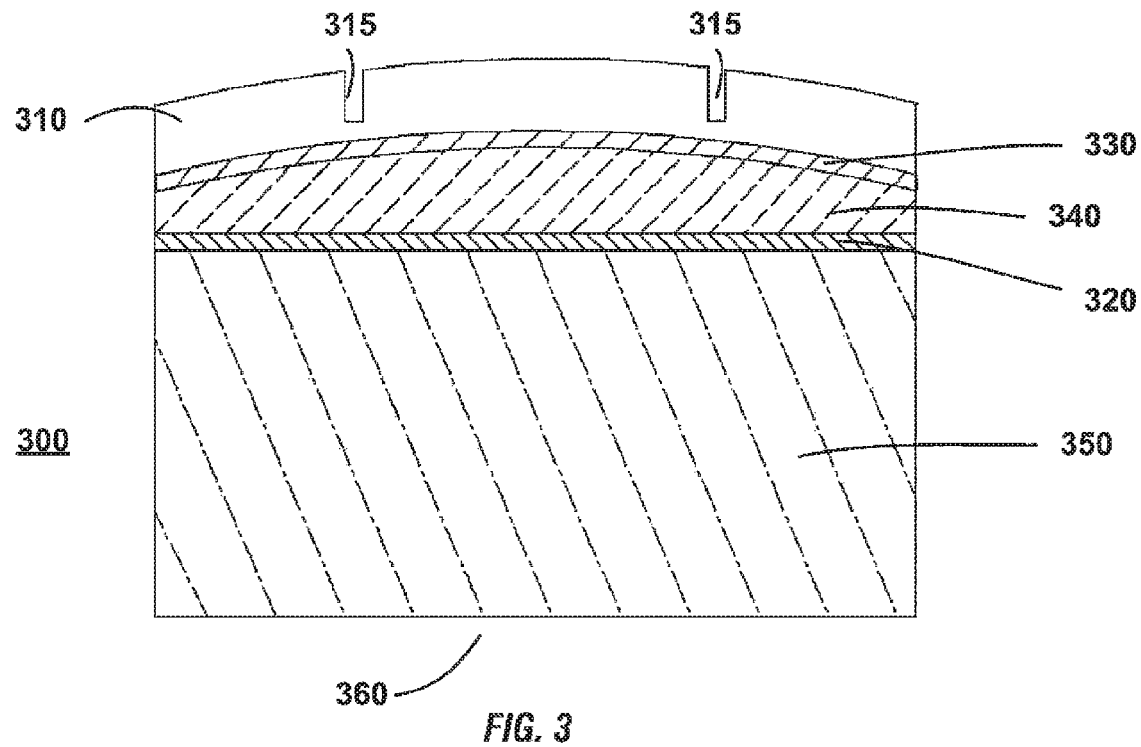
FIG. 3 depicts a section view through a meridian plane of the exemplary embodiment of tire 300 having an outer membrane following an arcuate profile and a shear layer of variable thickness.
Figure 9:
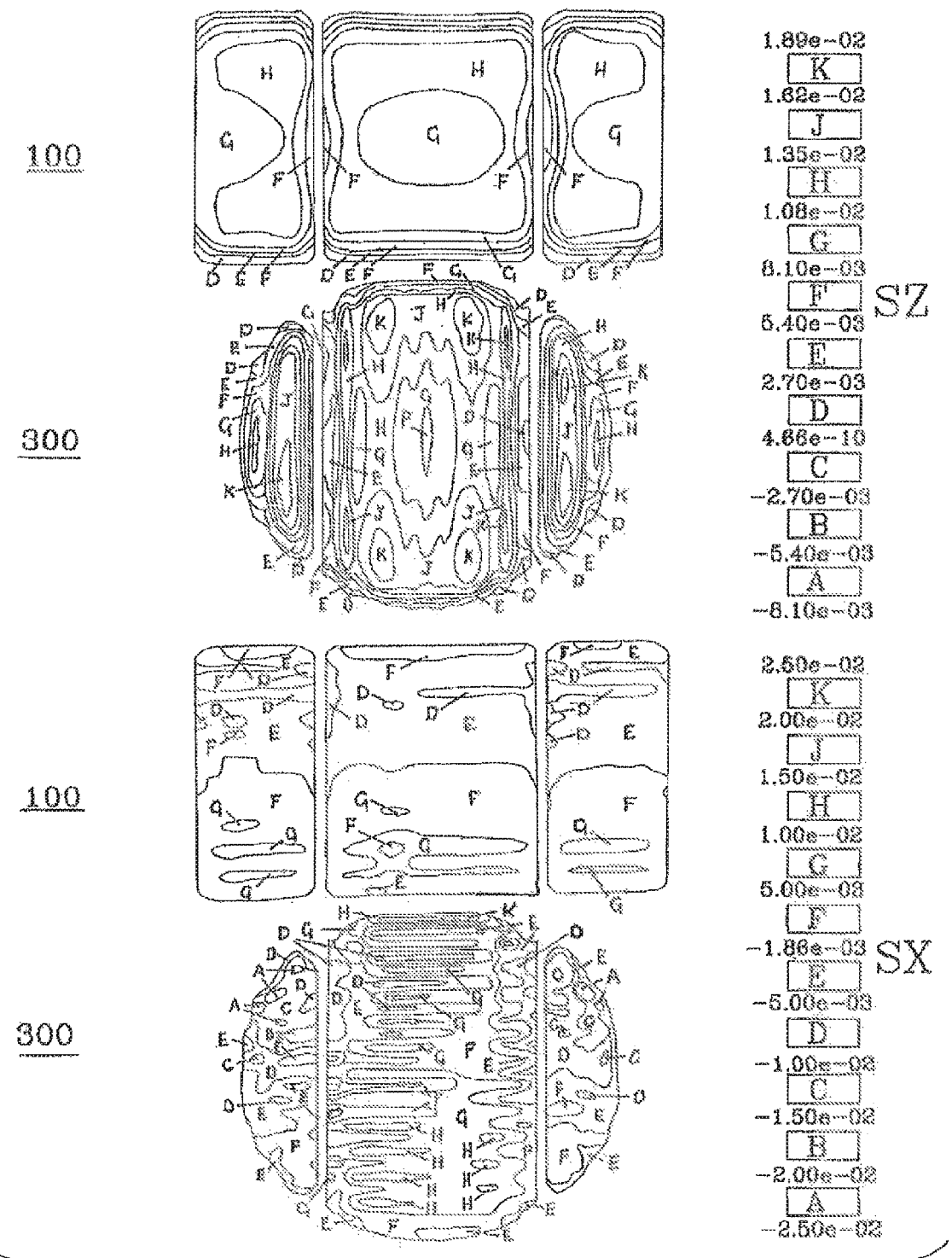
FIG. 9 is a contour depiction of the vertical and tangential contact stresses for the exemplary embodiment of tire 100 as compared to the exemplary embodiment of tire 300.
Figure 10:
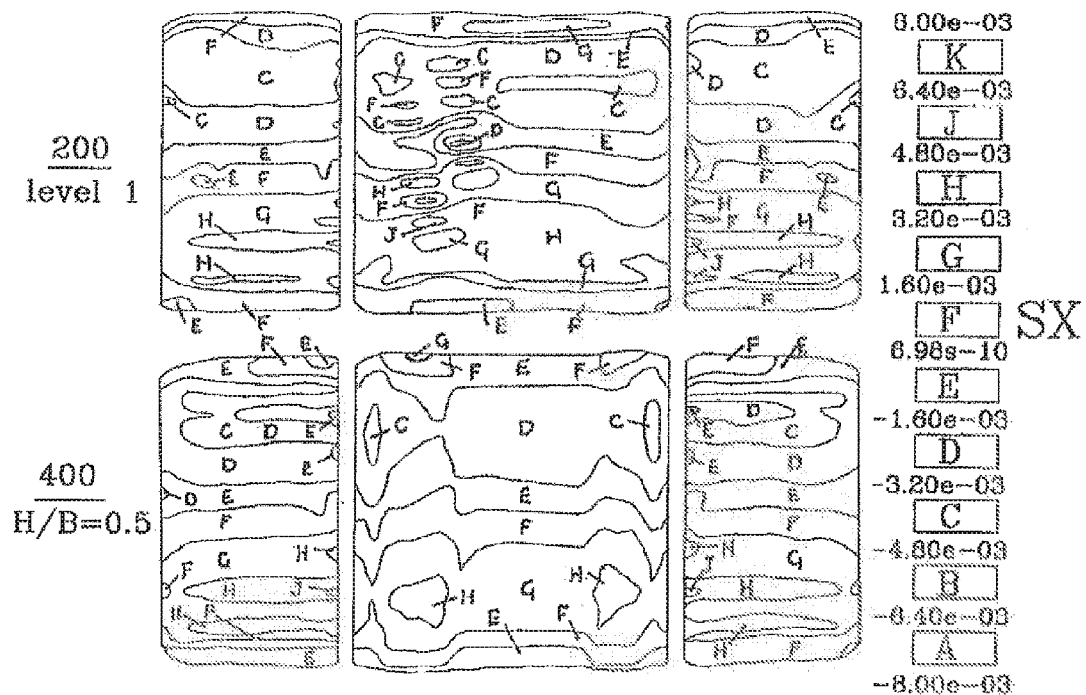
FIG. 10 is a contour depiction of the tangential contact stresses for the exemplary embodiment of tire 200 (level 1) as compared to the exemplary embodiment of tire 400 with H/B of 0.5.
Figure 11:
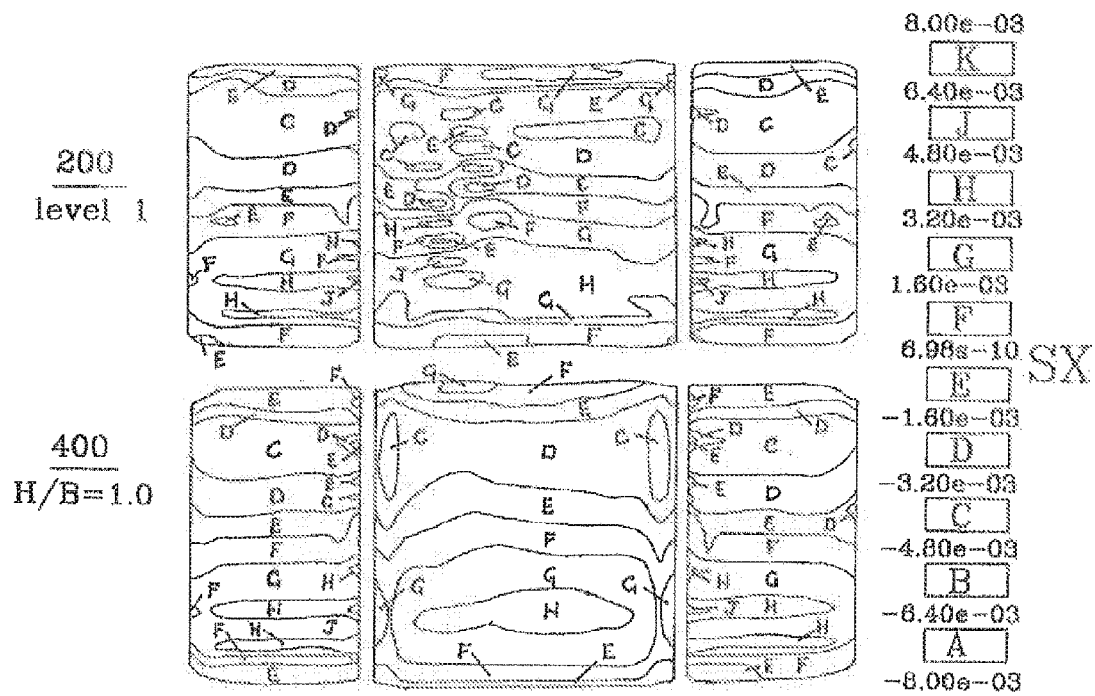
FIG. 11 is a contour depiction of the tangential contact stresses for the exemplary embodiment of tire 200 (level 1) as compared to the exemplary embodiment of tire 400 with H/B of 1.0.

In another exemplary embodiment shown in FIG. 3 as tire 300 applies the principle of controlling the product ($G_{eff}$*h) through a variation of the thickness h of the shear layer 340. The tire 300 is the same as the tire 100 except that the outer inextensible membrane now follows an arcuate profile with a radius R of 500 mm. The result is that the thickness h of the shear layer 340 varies from the initial 19 mm in the center portion to about 9.5 mm at the lateral edges. The tread 310 remains at a constant thickness=10 mm. Effectively, as can be seen in FIG. 3, the tire 300 resembles a rounded profile pneumatic tire that a person skilled in the art may propose to provide increased contact pressure in the central portion of the contact area. However, the embodiment of tire 300 remains as a fully non-pneumatic structure. FIG. 9 provides the comparison of the present embodiment of tire 300 to the reference tire 100. One immediately sees that the shape of the contact area of tire 300 is extremely round compared to the nearly rectangular shape of tire 100. FIG. 9 further demonstrates that the tire 300 contains discrete zones of very high pressure, something that is undesirable for optimized tire wear. However, the model data shown in Table 1 demonstrates that the variation of the shear layer thickness is a far less effective approach to modifying the average contact pressure. Compared to the reference tire 100, the average contact pressure SZ in the central portion of tire 300 has increased only 25% (from 0.93 bars to 1.16 bars). One could conclude that the use of a rounded profile, as would be suggested by a design approach known for pneumatic tires, is inefficient.

The foregoing embodiments illustrate exemplary approaches to obtain a control over the vertical contact stress SZ in the non-pneumatic tires 200 and 300. An increased contact pressure in the center portion of the contact is advantageous for traction improvement. However, the tire must also perform well in tread wear to provide complete customer satisfaction. As previously, discussed, a balanced tangential stress (in particular the average value of x-direction stress SX) favors even tread wear across the width of the tread area. Turning again to Table 1 and to FIG. 12 which graphically presents the data of Table 1, the results tangential stresses SX for the reference tire 100 demonstrate a slightly positive or "driving" stress on the center portion and a slightly negative or "braking" stress on the lateral portions. In general, to obtain acceptable tread wear, large braking stresses should be avoided within the contact area. For the tire 200 (level 1), an imbalance begins to appear with the tangential stresses increasing to about 0.05 bars; driving in the center, and braking in the shoulder. For tire 200 (level 2), the increased modulus of center section nearly doubles the tangential stresses to about 0.09 bars, again driving in the center, and braking in the shoulder. The tire 300, the rounded crown embodiment, produces unacceptably large driving stress in the center (about 0.29 bars) and braking in the lateral portion (about −0.70 bars).

Figure 4:
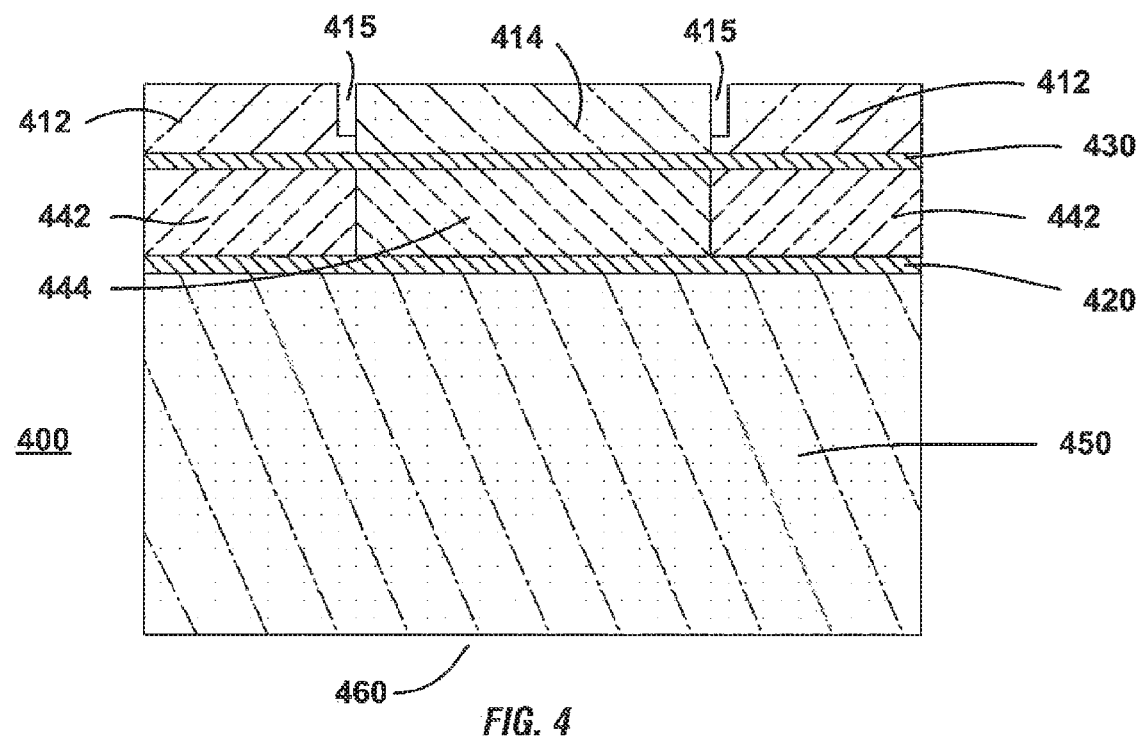
FIG. 4 depicts a section view through a meridian plane of the exemplary embodiment of tire 400 having a shear layer comprising center and lateral portions and a tread layer comprising center and lateral sections.

The inventor has discovered that the distribution and magnitude of the vertical and tangential stresses may be optimized by changes to the longitudinal compliance of the tread sections. In still another exemplary embodiment of the invention as shown in FIG. 4 for the tire 400, the tread layer comprises a central tread section 414 and lateral or shoulder tread section 412 wherein the each section has different material properties. In the particular example of tire 400 the tread section 414 between the two circumferential grooves 415 is modified. The tread material 1 corresponding to tread section 412 is unchanged compared to tire 100. The tread material 2 corresponding to the central tread section 414 has been modified to reflect an increased longitudinal shear compliance relative to the tread section 412. In other embodiments still within the scope of the invention, a tire may have a plurality of laterally distributed tread sections having a specified set of material properties.

Figure 5:
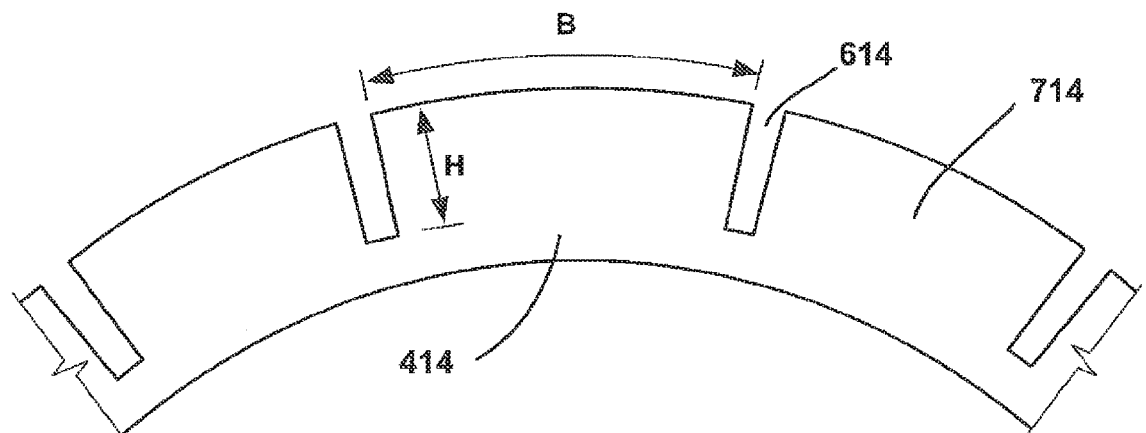
FIG. 5 is a schematic view of a tire taken through the equatorial plane and showing an arrangement of tread grooves.

In the exemplary embodiment of tire 400, this modified compliance results from adding laterally oriented grooves to the tread section. In still other embodiments of the tire 400, the modified compliance may be obtained through orthotropic material properties for each of the tread sections. FIG. 5 depicts a schematic cross section through the equatorial plane of the tire 400 having a plurality of laterally oriented grooves 416 spaced around the circumference of the tire which then define a plurality of discrete tread elements, for example tread blocks. As used herein, the meaning of laterally oriented grooves includes those grooves or thin incisions, such as sipes, oriented either transversely or at an angle to the longitudinal grooves 415. As depicted in FIG. 5, the bending deformation a tread block 417 is a function of the circumferential length of the block B and the tread depth H. Parametrically, this level of compliance is indicated by the parameter H/B, where a higher value of H/B indicates a tread section with a lower value of bending stiffness. By way of illustrative example and to provide a physical interpretation, a value of H/B of zero corresponds to a continuous rib. A value of H/B of about 0.3 corresponds to a summer tire, and a value of H/B of about 0.6 corresponds to an all-season tire.

The FEA model of tire 400 maintains a geometry which is a solid of revolution, but where the elements of the tread sections 414 may have a stiffness that has been modified to account for parameter H/B for the deformation in bending of a tread block 417. In this particular example of the tire 400, the tread compliance was set to values of H/B of 0.5 and 1.0. In all other respects, the tire 400 retains the properties of tire 200 (level 1). FEA results for the contact stresses for tire 400 were obtained. FIG. 12 and the data shown in Table 1 demonstrate that the increased compliance in the tread or tire 400 has only a small effect on the desired increase of the vertical stress SZ in the center portion of the tread. In particular, tire 200 (level 1) produces a value of SZ of 1.39 bars for the center rib, whereas both examples of tire 400 maintain the advantageous center loading with an SZ of about 1.30 bars. The clear advantages of the embodiments of tire 400 are demonstrated by an examination of the tangential stress SX. Here, the adjustment of the center rib compliance to a value of H/B of about 1.0 produces an essentially zero tangential stress across the entire width of the tread portions. This result is even better equilibrated than the tangential stress SX predicted for the reference tire 100. Therefore, the embodiment of the invention described by the tire 400 provides the desirable center loading for traction while actually improving the distribution of the tangential stresses. Therefore, the tire 400 is able to break the compromise that is inherent in a pneumatic tire.

TABLE 1

Summary of Model Results

| Tire 100 | R1 | R2 | R3 | Tire 200 (level 1) | R1 | R2 | R3 |
| --- | --- | --- | --- | --- | --- | --- | --- |
| Area | 56.7 | 102.0 | 56.7 | Area | 45.3 | 82.0 | 45.3 |
| Fx | −1.0 | 1.9 | −0.9 | Fx | −1.9 | 3.9 | −1.9 |
| Fz | 52.6 | 95.1 | 52.3 | Fz | 43.1 | 113.7 | 43.1 |
| X Stress (SX) | −0.02 | 0.02 | −0.02 | X Stress (SX) | −0.04 | 0.05 | −0.04 |
| Z Stress (SZ) | 0.93 | 0.93 | 0.92 | Z Stress (SZ) | 0.95 | 1.39 | 0.95 |
| Tire 200 (level 2) | R1 | R2 | R3 | Tire 300 | R1 | R2 | R3 |
| Area | 33.7 | 61.6 | 33.8 | Area | 25.0 | 121.0 | 25.0 |
| Fx | −2.9 | 5.8 | −2.9 | Fx | −17.5 | 35.3 | −17.8 |
| Fz | 33.0 | 134.0 | 33.0 | Fz | 23.0 | 140.0 | 23.0 |
| X Stress (SX) | −0.09 | 0.09 | −0.09 | X Stress (SX) | −0.70 | 0.29 | −0.71 |
| Z Stress (SZ) | 0.98 | 2.18 | 0.98 | Z Stress (SZ) | 0.92 | 1.16 | 0.92 |
| Tire 400 H/B = 0.5 | R1 | R2 | R3 | Tire 400 H/B = 1.0 | R1 | R2 | R3 |
| Area | 45.5 | 85.3 | 45.5 | Area | 45.5 | 85.3 | 45.5 |
| Fx | −1.2 | 2.4 | −1.2 | Fx | −0.2 | 0.4 | −0.2 |
| Fz | 45.0 | 110.0 | 45.0 | Fz | 45.0 | 109.0 | 45.0 |
| X Stress (SX) | −0.026 | 0.028 | −0.026 | X Stress (SX) | −0.005 | 0.005 | −0.003 |
| Z Stress (SZ) | 0.99 | 1.29 | 0.99 | Z Stress (SZ) | 0.99 | 1.28 | 0.99 |

DETAILED DESCRIPTION OF INDUSTRIAL APPLICATIONS

Given the promising results of the FEA study, the inventor proceeded to apply the principles of the variable pressure shear band to an actual tire. Accordingly, a detailed description of that tire, a reference tire that lacks an annular shear band, and test results for both tires are provided below.

Turning to FIG. 13, a sectional view of a tire 500 lacking a reinforced annular shear band taken along a meridian plane of the tire that has standard pneumatic tire architecture is shown. This standard architecture includes a carcass ply 510 near the interior of the tire 500 upon which a first crossed ply belt 520 sits. A second crossed ply belt 530 is situated above the first crossed ply belt 520 and is separated from the first cross ply belt 520 by a thin section of rubber 540. This section of rubber does not act as a variable pressure shear layer because it lacks the necessary ($G_{eff}$*h). Also, the belts 520, 530 do not act as inextensible membranes as they lack the necessary tensile modulus. A nylon strip 550, which is wrapped around the tire 500 in the substantially longitudinal or x-direction of the tire and is paced along the axial or y-direction of the tire, is located on top of the second crossed ply belt 530. The purpose of the nylon strip 550 is to increase high speed endurance of the tire, reducing the possibility of belt separation at high operating speeds. The tire 500 also has an inner liner 560 on the interior of the tire 500 that helps to retain air or gas in the tire. The inner liner 560 may be constructed from any suitable material capable of retaining the tire's inflation pressure and is preferably constructed from a halobutyl rubber. A tread portion 570 with grooves 580 is found on top of the belt package and annular reinforcement for improving the traction of the tire 500 as it passes through water and the like. The grooves 580 of the tread 570 provide for water consumption so that the surface of the tread may more easily penetrate the water and make contact with the ground.

For this particular embodiment, the size of the tire 500 is 205/55R16 with the width, $W_{570}$, of the tread portion 570 being about 165 mm and the tire 500 is held onto the wheel of a vehicle by sidewalls 590 that terminate in bead sections (not shown) on both sides of the equatorial plane E-E. The construction of the tire 500 is symmetrical about the equatorial plane E-E.

Conversely, FIG. 14 shows a sectional view taken along a meridian plane of a pneumatic tire 600 that employs a specific embodiment of a variable pressure shear band. This tire 600 has an inner liner 660, carcass ply 610, tread section 670 with grooves 680 and a belt package including a first crossed ply belt 620 and a second crossed ply belt 630 similar to what has been described above for tire 500. It is also a 205/55R16 sized tire with the width, $W_{670}$, of the tread portion 670 being about 165 mm. It too is held onto the wheel of a vehicle by sidewalls 690 that terminate in bead sections (not shown) on both sides of the equatorial plane E-E. The construction of this tire 600 is also symmetrical about the equatorial plane E-E. However, it has the following structural differences as compared to reference tire 500.

First, it has a first membrane 640 that is located immediately above the carcass ply 610 that may take the form of a ply of glass monofilaments, made from a material that is disclosed by U.S. Pat. No. 7,032,637, that are wrapped spirally in the longitudinal or x-direction of the tire and that are paced in the axial or y-direction of the tire. Advantageously, the glass monofilaments have properties such as compressive modulus of approximately 12,000 MPa, a tensile modulus of approximately 40,000 MPa, and/or an infinite endurance limit at a compression strain of about 1 percent that allow them to effectively resist compression, which given their location near the interior of the tire 600, helps the tire resist buckling in the longitudinal or x-direction of the tire near the contact patch when the tire 600 encounters water. When constructed with the above mechanical properties, each cord 642 preferably has a cross-sectional area of about 0.43 mm$^2$ or larger and are arranged at a pace of at least about 1.4 mm in the axial or y-direction of the tire. Such a construction provides an equivalent homogenous thickness (area per cord/pace) of about 0.30 mm$^2$ per mm width of the ply. The cords 642 are made of glass fibers that are impregnated in a thermoset resin having an initial modulus of extension of at least about 2.3 GPa. The fibers are all configured parallel to each other. The elongate composite element has a strain to failure in compression greater than the strain to failure in tension. Preferably, the thermoset resin has a glass transition temperature, $T_g$, greater than 130° C. No matter what construction is used, the ratio of the membrane modulus, $E_{MEMBRANE}$, of this membrane 640 to the shear modulus, $G_{eff}$, of the shear layer 645 should be at least about 100:1. For example, the $E_{MEMBRANE}$ could be 9000 N/mm$^2$ and the $G_{eff}$ could be 3 N/mm$^2$ which would yield a ratio of about 3000:1.

Next, a shear layer 645 having a variable thickness, T, is found above the first membrane 640 that is made of rubber and is adhered thereto. This rubber material may have properties such as a dynamic shear modulus that ranges from 1.9 to 5 MPa, an elongation at break at 100° C. that may be greater than about 100% and a hysteresis that is less than about 0.2 at strains between about 15% and 30%. Rubber material having similar properties can also be used in the skims used to contain the cords of the first and second membranes 640, 650. Also, the thickness, T, of the shear layer 645 may vary from 2 mm to 20 mm. For this particular embodiment, the shear layer 645 has a shear modulus that is about 3 MPa and the thickness, T, of the shear layer 645 varies from about 2 mm in the shoulder regions of the shear layer 645 to about 6 mm at the equatorial plane E-E of the tire 600. Interestingly, the thickness, T, of the shear layer 645 moves in a positive z-direction or radial inward direction so that the neutral fiber 647 of the shear layer 645 also moves in this direction. Hence, this embodiment provides a varying ($G_{eff}$*h) in the shear layer that gives the desired properties of the variable pressure shear band. The inward movement of the neutral fiber 647 allows an alternate tread profile 670' to be used which improves hydroplaning while not degrading the wear performance of the tire 600 for reasons that will be explained more clearly later. Thus, this alternate tread profile 670' has an increased outward radial thickness as compared to the standard tread profile 670.

Finally, a second membrane 650 that is substantially inextensible is found above the shear layer 645 and is adhered thereto. This membrane 650 may take the form of a first crossed ply belt 620 that is found immediately above the shear layer 645 and a second crossed ply belt 630 that is found immediately above the first crossed ply belt 620. These belts are constructed from steel cords 652 that are enrobed in a rubber skim that has properties as described above. The cords 652 may be posed at angles that range from 15 to 25 degrees and are posed at +/-22 degrees for this particular embodiment. While it is common to use cords in the belts that are posed at equal and opposite angles to the equatorial plane E-E, it is contemplated that the cords could be posed at different angles creating a tire that is asymmetrical with respect to the equatorial plane. These belts 620, 630 are constructed so that the ratio of the membrane modulus, $E_{MEMBRANE}$, for this membrane 650 to the shear modulus, $G_{eff}$, of the shear layer 645 is at least about 100:1, which is not the case for the belts 520, 530 of tire 500 which is why those belts and the rubber that separates them do not comprise a shear band. Furthermore, the second membrane 650 is offset in the positive z-direction or the inward radial direction a sufficient distance to protect the structure of the second membrane 650 from cuts and small penetrations of the tread 670.

It should be noted that the adherence of the membranes 640, 650 to the shear layer 645 is typically provided by the vulcanization of the elastomeric materials which comprise the membranes and shear layer. Alternatively, the membranes may be adhered to the shear layer by any suitable method of chemical or adhesive bonding or mechanical fixation. Likewise, the membranes may be formed by any suitable material or construction which meets the requirements for the tensile stiffness, bending stiffness and compressive buckling resistance required of an annular shear band. For example, the structure of the membranes may be any of several alternatives such as homogeneous material, a fiber reinforced matrix, or a layer having discrete reinforcing elements provided the mechanical properties described herein are met. When conventional tire reinforcements are used, monofilaments or cords made of materials such as steel, aramid other high modulus textiles may be employed.

Accordingly, the first and second membranes may be formed by annular reinforcements that are wound substantially in the x-direction and paced in the y-direction of the tire. These annular reinforcements may be formed by cords that are made of steel or some other suitable material. In like fashion, the shear layer may be altered and have a center portion that has a higher shear modulus than in its shoulder portions or may have other constructions and/or properties as were investigated using FEA.

After tires 500, 600 were built, they were tested using different test procedures. One such test procedure involves running the tires that have been placed on a vehicle through a puddle of water on top of a plate of glass where pictures can be taken to see how much surface area of the tread of the tire remains in contact with the ground under certain conditions. This test can be repeated for the same tire at different speeds to determine when 90% of the contact of the tire on the ground is lost, indicating that the tire is hydroplaning.

Figure 15:
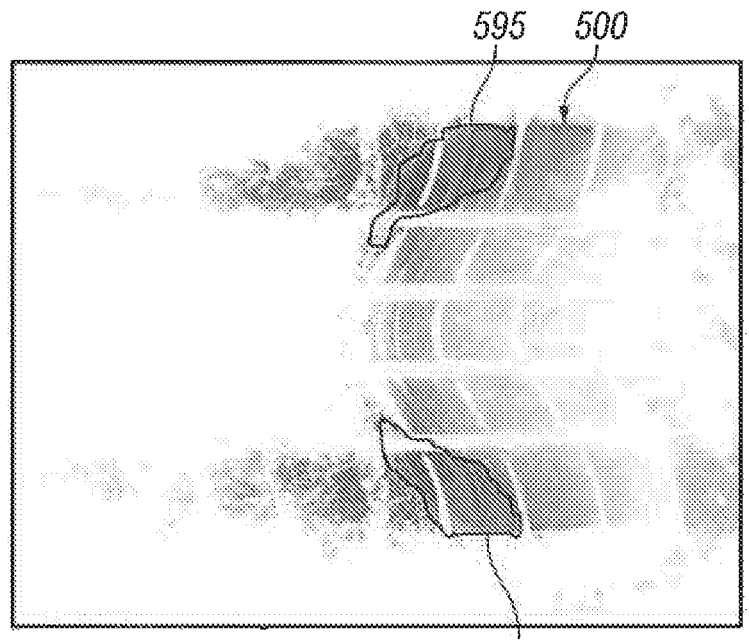
FIG. 15 shows the area of contact between a conventional tire 500 and the ground while traveling through water at 88 kph with a standard internal air pressure of 2.1 bars based upon a photograph taken during testing.
Figure 16:
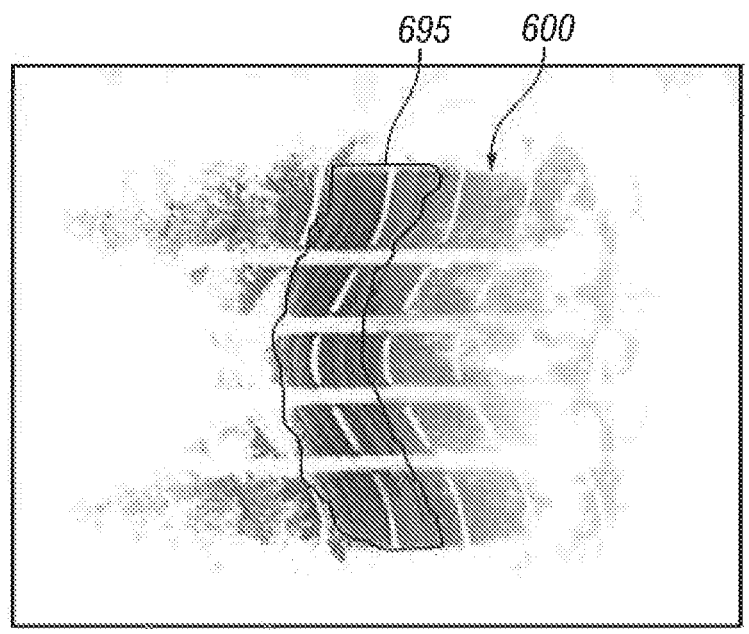
FIG. 16 shows the area of contact between a tire 600 having a variable pressure shear band and the ground while traveling through water at 88 kph with a standard internal air pressure of 2.1 bars based upon a photograph taken during testing.

FIGS. 15 and 16 are representations of photographs taken of tires 500, 600; respectively, while being tested using this procedure and traveling through 4 mm of water depth at 88 kph with a standard internal air pressure of 2.1 bars and a vertical load of 450 kg being applied to them. Under these conditions, tire 500 managed to have a surface contact area, which is outlined by lines 595 and 595', of only 13 cm² while tire 600 still had a surface contact area, which is outlined by line 695, of 45 cm². This indicates that tire 500 was hydroplaning with approximately 91% of the contact surface area being lost. Conversely, tire 600 had 3.5 times as much surface area still in contact with the ground, indicating that it could travel another 7 kph faster based on extrapolation before hydroplaning occurs. This allows a tire designer to decrease the tread void area from 30% to 20% in tire 600 while maintaining the same hydroplaning performance of standard tire 500. This may translate into a 20% improvement in the wear performance of tire 600 or allow the tire designer to improve other properties such as wet and dry traction, etc.

Figure 17:
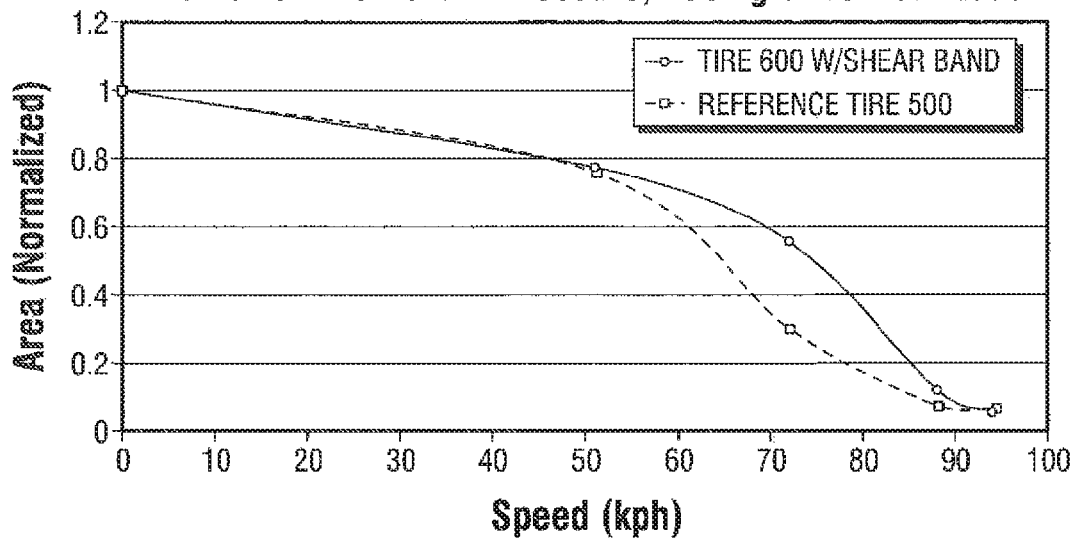
FIG. 17 is a graph that shows the amount of contact area between the conventional tire 500 and the ground and between the tire 600 having a variable pressure shear band and the ground while traveling at various speeds through water at a slightly deflated internal air pressure of 1.6 bars.

Looking at FIG. 17, this same test procedure was applied to both sets of tires 500, 600 at various speeds with a slightly deflated internal air pressure of 1.6 bars and an external vertical load of 450 kg being applied to them. The amount of surface contact area for each test run at each speed was normalized compared to the original surface contact area by dividing the reduced surface contact area by the original contact area. These values are plotted along the vertical axis while the speeds were plotted along the horizontal axis. A reduced internal air pressure was used in order to see what benefit the tire 600 with the variable pressure shear band had over the reference tire 500 in hydroplaning when the tires were slightly deflated, which is a poor scenario for hydroplaning performance. As can be seen, the performances for both tires 500, 600 were similar until a speed of 50 kph was reached. Thereafter, tire 600 retained more surface contact area than tire 500 and did not hydroplane, which occurs at about a normalized area of about 0.18, until it reached approximately 88 kph. On the other hand, tire 500 began hydroplaning at approximately 80 kph. This illustrates that the variable shear band provides additional structural stiffness beyond that provided by the pneumatic component of stiffness typically found in pneumatic tires, resulting in improved hydroplaning performance. This provides the tire designer extra flexibility to thin the sidewalls 690 of tire 600 and still retain or exceed the hydroplaning performance of reference tire 500. This, in turn, can lead to a reduction in rolling resistance.

Figure 18:
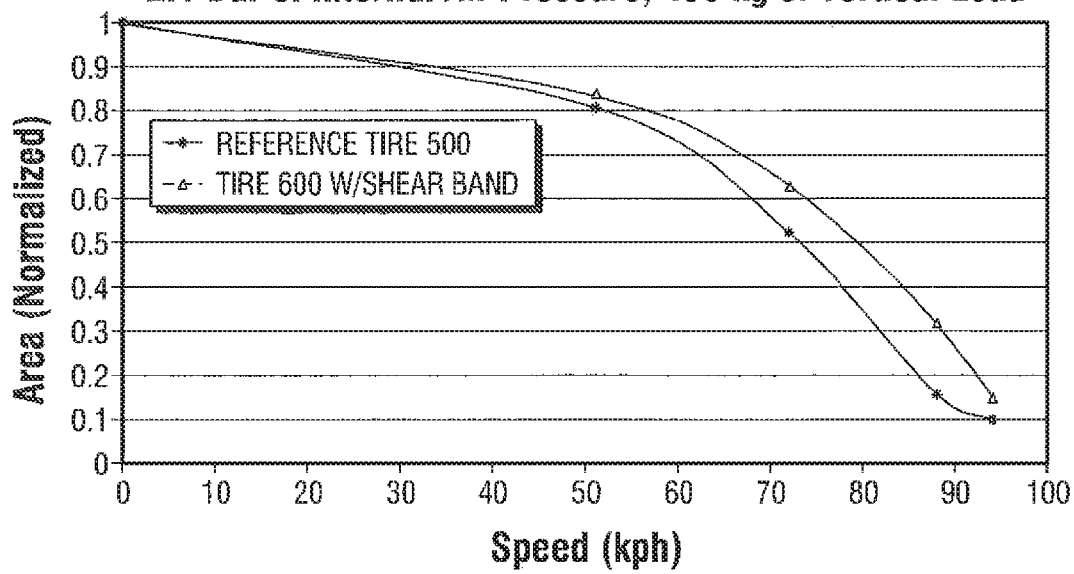
FIG. 18 is a graph that shows the amount of contact area between the conventional tire 500 and the ground and between the tire 600 having a variable pressure shear band and the ground while traveling at various speeds through water at a standard internal air pressure of 2.1 bars.

Similarly, reference tire 500 and tire 600 with the variable pressure shear band were tested using essentially the same test procedure as discussed above for the results presented by FIG. 17, except that both tires were fully inflated to an internal air pressure of 2.1 bars. The results of this test are presented in FIG. 18 and are presented in the same format as used in FIG. 17. The test results showed that hydroplaning, which occurred approximately at a normalized area of about 0.18, for tire 600 happened at a speed of 94 kph while it happened with reference tire 500 at about 88 kph. Again, this gain of 6 kph before hydroplaning occurs gives the tire designer the ability to improve any two of the following performances: hydroplaning, wear and rolling resistance; without degrading the other remaining performance.

Figure 19:
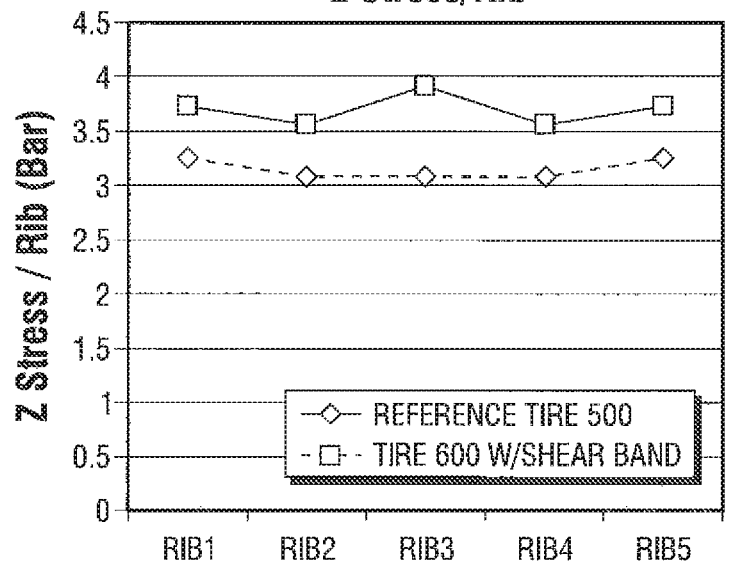
FIGS. 19, 20 and 21 show the Z stresses, Y stresses and X stresses respectively for ribs R1 thru R5 of tires 500, 600 at a standard internal air pressure of 2.1 bars and a load of 410 DaN.
Figure 20:
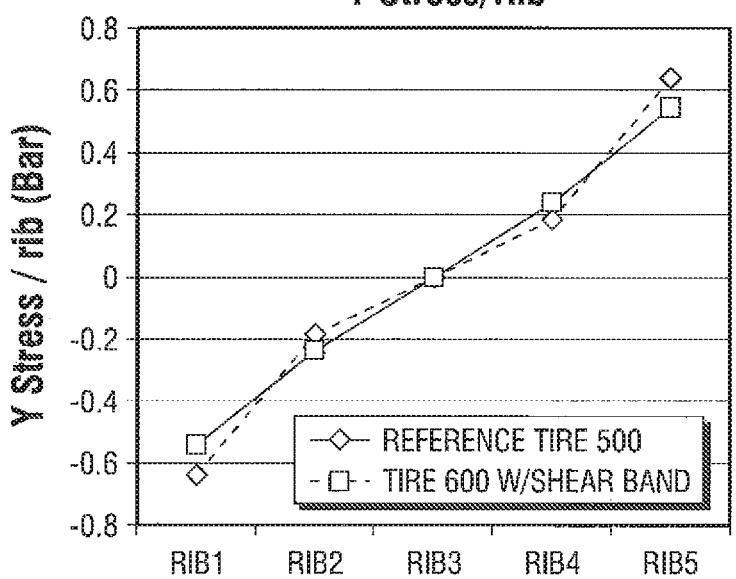
Figure 21:
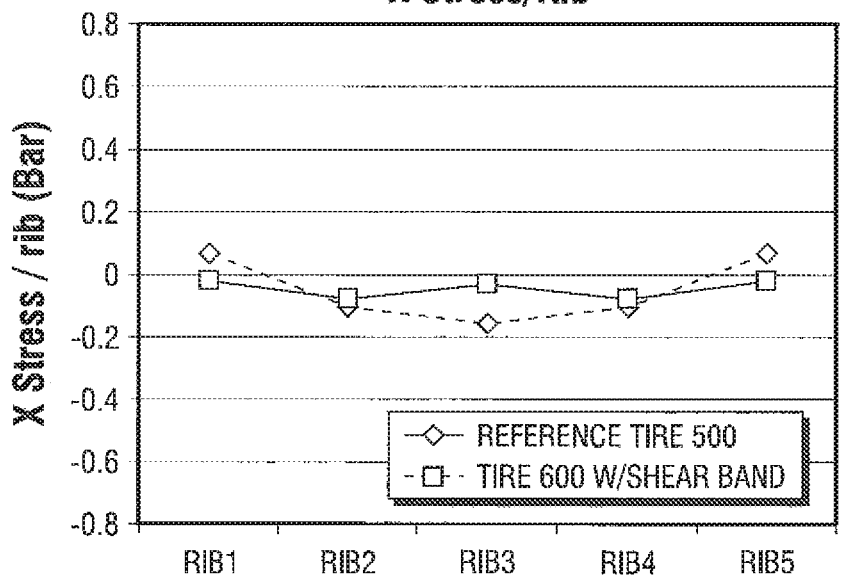

FIGS. 19, 20 and 21 show the Z stresses, Y stresses and X stresses; respectively, for ribs R1, R2, R3, R4 and R5 of tires 500, 600 at a standard internal air pressure of 2.1 bars and a vertical load of 410 DaN that were measured by means commonly known in the art on a testing machine that has a force transducer.

Looking at the Z stresses shown by FIG. 19, tire 600 with the variable pressure shear band developed slightly higher stresses across all the ribs, R1 thru R5, with comparatively similar gradients between ribs, R1 and R2, and between ribs, R4 and R5 as occurred between the same ribs for reference tire 500. However, a larger gradient (approximately 0.5 bar) occurred from R2 or R4 to R3 for tire 600 that had the variable pressure shear band while there was virtually no change between the same ribs for reference tire 500. This is desirable as this increase in pressure in the center of the footprint helps tire 600 resist deformation when it encounters water, thereby improving the hydroplaning performance of tire 600 as compared to reference tire 500. Also, the slightly larger Z stresses provided by the shear band of tire 600 is also helpful in preventing hydroplaning.

The Y stresses shown in FIG. 20 for tire 600 is essentially the same as those for reference tire 500, indicating that no degradation of the wear performance that could be caused by such stresses will occur when using the variable pressure shear band.

Figure 22:
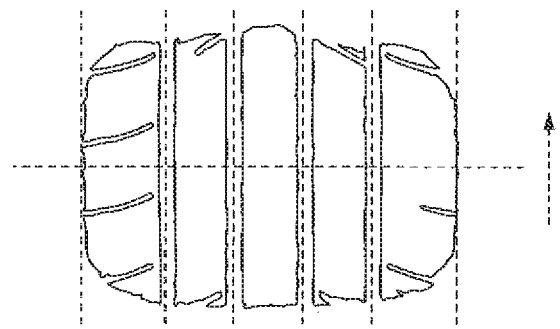
FIG. 22 shows the footprint of tire 500 at a standard internal air pressure of 2.1 bars and a load of 410 DaN.
Figure 23:
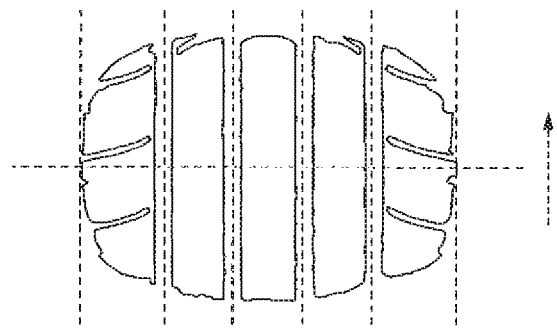
FIG. 23 shows the footprint of tires 600 at a standard internal air pressure of 2.1 bars and a load of 410 DaN.

Finally, the X stresses depicted by FIG. 21 indicate that the X stresses are actually better equilibrated for the modified architecture. Particularly, the shoulder ribs (R1, R5) have X stresses that are not braking and the center rib (R3) has X stresses that are not driving, as would be expected for a tire having a rounded footprint, which is desirable for improved hydroplaning performance. This phenomenon, which corroborates the FEA results discussed above, is further illustrated by FIGS. 22 and 23 that show the footprints of reference tire 500 and tire 600 that has a variable pressure shear band, respectively. Footprints were taken at 410 DaN of vertical load and 2.1 bars of internal air pressure. Note that the modified architecture has a rounder shape, with the shoulders being significantly shorter than the center. However, the X stresses are very well equilibrated for this tire 600, due to the change of the radial position of the neutral fiber 647. Consequently, a more rounded crown such as that utilized in the alternate tread profile 670' can be used in conjunction with the variable pressure shear band to improve hydroplaning without degrading the wear performance of tire 600 as compared to reference tire 500, as mentioned previously.

In order to further test the hydroplaning performances of tires 500 and 600, they were tested according to another test procedure which is as follows. First, two tires of like construction are placed on the front wheels of a vehicle, such as an Audi A4, that has front wheel drive. Second, the vehicle is driven through water having a depth of 8 mm on an asphalt track at a speed of 50 kph. Preferably, this speed is maintained by using cruise control on the vehicle. Once the vehicle reaches the validation area, the driver accelerates the vehicle as quickly as possible for 30-50 m (this distance is fixed as desired) to see if 10% slip is generated between the speed of the drive wheels and the GPS speed of the vehicle. If 10% slip is achieved, this same test run is repeated three more times. If 10% slip is not achieved, then the test run is performed by adding 5 kph to the initial vehicle speed. This step is then repeated until 10% slip is achieved. Once the 10% slip is achieved, then another three runs at the same conditions as previously described is conducted. Usually, five total runs are made with the first and last runs being used for reference only. Data is then acquired from these runs and a statistically relevant calculation of the speed at which hydroplaning occurs, which corresponds to the vehicle speed at which 10% slip happens, can be made.

When using this test procedure, it was found that hydroplaning occurred at approximately 57.5 kph for reference tire 500 while hydroplaning occurred at about 61 kph for tire 600 that had the variable pressure shear band. This shows that there is at least a 5% improvement between these tires which provides further proof that the variable pressure shear band can improve the hydroplaning performance of a tire without degrading wear or rolling resistance performances.

While this invention has been described with reference to particular embodiments thereof, it shall be understood that such description is by way of illustration and not by way of limitation. For example, the industrial applications discussed herein involved the use of a pneumatic tire with conventional sidewalls and bead sections. However, it is contemplated that this invention can be used with non-pneumatic tires, hybrid tires and other products as well that have various constructions including those that use web spokes to connect the tire to the wheel of a vehicle. Also, symmetrical tires have been predominately discussed herein but it is contemplated that tires that have asymmetric treads are also within the scope of the present invention. Accordingly, the scope and content of the invention are to be defined only by the terms of the appended claims.

What is claimed is:

1. A tire with a ground contacting portion and having radial, longitudinal and axial directions and an equatorial plane, said tire comprising a variable pressure shear band including:
    a shear layer having a cross-section wherein the product (Geff*h) varies in the axial direction of the tire;
    a first membrane that is adhered to the radially inward extent of the shear layer said first membrane having reinforcements wrapped spirally in the longitudinal direction; and
    a second membrane that is adhered to the radially outward extent of the shear layer,
    wherein Geff is the effective dynamic shear modulus and h is the height of the shear layer,
    wherein the ground contacting portion has a tread with shoulder portions at each axial extent thereof and a center portion therebetween and wherein the shear layer also has shoulder portions at each axial extent thereof and a center portion therebetween, said shoulder portions and center portion of the shear layer being found substantially radially below the shoulder and center portions of the tread respectively, said shear layer having a thickness that increases in a radially inward direction as the shear layer progresses from its shoulder portions to its center portion in the axial direction,
    wherein the shear layer is thinnest at its shoulder portions and thickest at its center portion and wherein the neutral fiber of the shear layer moves radially inward as the shear layer progresses from its shoulder portions to its center portion, said neutral fiber reaching its lowest position substantially at the equator of the tire.

2. The tire of claim 1, wherein the shear layer is constructed of a material having a relatively consistent Geff with the height (h) of the shear layer varying.

3. The tire of claim 2, which the first and second membranes comprise annular reinforcements that are posed substantially in the longitudinal direction of the tire.

4. The tire of claim 1, wherein the tread has an increased outward radial thickness near the equatorial plane of the tire.

5. The tire of claim 1, wherein the shear layer comprises a plurality of axially disposed portions having different values of Geff.

6. The tire of claim 1, wherein the ground contacting portion of the tire comprises a tread that has shoulder and center portions wherein the shoulder portions of the tread have different material properties than the center portion, which has an increased longitudinal shear compliance relative to the shoulder portions of the tread.

7. The tire of claim 1, wherein the ground contacting portion of the tire comprises a tread that has shoulder and center portions wherein said center portion of the tread comprises laterally oriented grooves of width (H) which define tread elements of length (B) that results in increased longitudinal shear compliance of the center portion of the tread as compared to the shoulder portions of the tread and wherein parameter (H/B) is an indicator of the level of longitudinal compliance.

8. The tire of claim 1, wherein the first membrane comprises glass monofilaments and wherein the second membrane comprises a first crossed ply belt and a second crossed ply belt that is on top of the first crossed ply belt.

9. The tire of claim 1, wherein the second membrane is substantially inextensible and wherein the first membrane resists compression.

10. The tire of claim 9, wherein the first membrane comprises glass monofilaments and wherein the second membrane comprises a first crossed ply belt and a second crossed ply belt that is on top of the first crossed ply belt.

11. The tire of claim 10, wherein the first and second crossed ply belts have steel cords posed at +/−(15 to 25) degrees with respect to the equatorial plane of the tire.

12. The tire of claim 11, wherein the first and second crossed ply belts have steel cords posed at +/−22 degrees with respect to the equatorial plane of the tire.

* * * * *